Patented July 16, 1929.

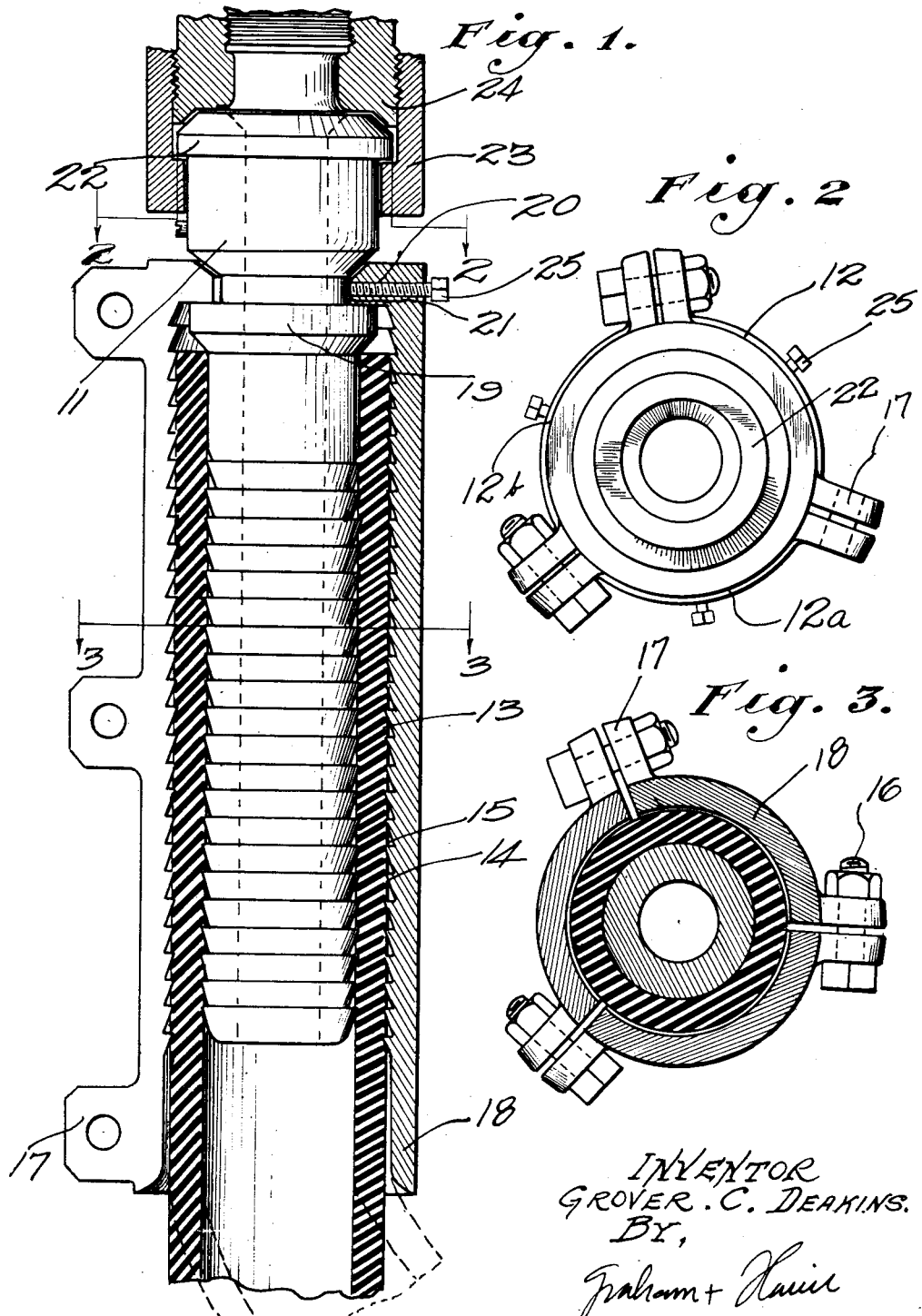

1,720,781

UNITED STATES PATENT OFFICE.

GROVER C. DEAKINS, OF ANAHEIM, CALIFORNIA.

CLAMP FOR PRESSURE HOSE.

Application filed June 25, 1924. Serial No. 722,276.

Although my present invention is referred to as a clamp for pressure hose, this invention comprises hose-attaching and hose-protecting features; and said invention may be utilized in the securing and preserving of hose of various sizes and of any usual or preferred type.

It is an object of this invention to provide hose clamping means comprising an inner or nipple member, which may be rigidly attached to a pipe or other outlet or inlet member, and a plurality of outer members or plates by which the end of a hose may be secured thereto; and, in a preferred embodiment of my invention, the said inner or nipple member may be formed integral or otherwise connected with a part of a union, for securing the same to any pipe or fitting; and said nipple may also be provided with circumferential means such as a groove or collar adapted to interfit with corresponding depressions or projections on the interior of said plates in such manner as to restrain or prevent relative longitudinal movement or "slippage" thereof.

It is a primary object of this invention to provide a hose clamp with an outwardly flaring or rounded skirt rigidly or integrally connected with the longitudinally extending outer clamping plates mentioned, said skirt extending beyond or below the end of the inner member or nipple and being so curved as to minimize the wear upon the confined hose, longitudinal movement between the mentioned elements being prevented by means such as the bolting of said plates to one another and also by a direct engagement between said inner and outer members; and a preferred embodiment of my invention suitable for use in the delivery of "slush" to the interior of a string of drill pipe, vertically reciprocated, may comprise three outer plates interiorly roughened, as by the providing of circumferential teeth backwardly inclined, said plates being radially adjustable relatively to a renewable inner or nipple member similarly roughened, and the upper end of said inner member may be provided both with a collar for the mentioned direct engagement and also with an additional collar, oppositely faced, for the retention of the coupling member of a union.

Other objects of my invention will appear from the following description of an advantageous embodiment thereof, taken in connection with the appended claims and the accompanying drawings, in which Fig. 1 is a longitudinal or vertical section of one advantageous embodiment of my invention.

Fig. 2 is a top plan view of such parts as lie wholly below the line 2—2 of Fig. 1.

Fig. 3 is a horizontal section taken substantially as indicated by the line 3—3 of Fig. 1.

Referring to the details of that specific embodiment of my invention chosen for purposes of illustration, 11 may be an inner member or nipple, adapted to be secured at the outlet or inlet end of any suitable pipe or fitting, and adapted to cooperate with outer members such as the plates 12, 12$^a$ and 12$^b$ in the secure retention of an end of a hose 13.

The inner member or nipple 11 and the outer members mentioned may be roughened on their inner surfaces in a known manner, as by the providing of inwardly and rearwardly extending teeth 14 formed or separated by annular grooves 15; and the said outer members may be radially adjustable by means such as bolts 16 extending through ears 17, integral therewith. The clearance between the opposing surfaces of the ears 17 may be sufficient to permit the secure retention of hose of various thicknesses; and it is an important feature of my invention that the lower ends of the mentioned outer members extend substantially beyond or below the lower end of the nipple 11, the inner edge of the outer members being rounded or flared in such manner as to form a skirt 18, for the protection of the hose 13 against sharp bending at the lower end of the nipple 11.

When the "slush" or mud containing sand is circulated through a hose, as in the drilling of oil wells by the rotation or reciprocation of a string of drill pipe, the sand contained in the circulated "slush" or mud has been found to produce a rapid wear and a consequent sharpening of the edges of an inner member or nipple used in the securing of hose; and, in order to preserve the position of the outer members referred to relatively to the nipple 11, so that any sharp edges formed at the lower end of said nipple can have little or no cutting effect upon the interior of a hose, I may prevent relative longitudinal movement between the mentioned inner and outer members, the inner member 11 being shown as provided with a collar 19, interfitting with projections or shoulders 20, extending over said collar and into a groove 21 immediately thereabove. The clearance between the projections or shoulders 20, which may be rigidly or integrally connected with the respective outer members, and the bottom of the groove 21 should be sufficient to permit considerable radial movement of said outer members in adaptation to hose of different thicknesses, and without occasioning a disengagement of the said projections from the collar 19.

The upper end of the inner member or nipple 11 may be of any suitable form adapting the same to be connected with a pipe or fitting; and I have shown said upper or inner end as provided with a collar 22, facing oppositely to the mentioned collar 19, and adapted to be engaged by and to cooperate in the retention of an element of a union, the coupling element 23 of a threaded union being shown as confined between the collar 22 and a stop in the form of a screw 24.

To enable the outer plates 12, 12ª, 12ᵇ to be used, in an emergency, with a smooth nipple, or with a nipple unprovided with the collar 19, I may optionally provide the same with additional engaging means such as the set screws 25, shown as extending through the shoulders 20, and of sufficient length to permit them to engage the nipple 11 regardless of the thickness of the hose interposed.

Although I have herein described one complete embodiment of my invention, it will be understood that various features thereof might be independently employed, and also that various modifications might be made, by those skilled in the art, without the slightest departure from the spirit and scope of my invention, as the same is indicated above and in the following claims.

I claim as my invention:

1. In a device of the class described, the combination of: an inner member having a nipple for extension into the end of a hose; a constricting member formed of a plurality of clamp plates adapted to be disposed about the outside of said hose adjacent to the end thereof; means for constricting said clamp plates radially to place a substantially uniform radial pressure against the outer surface of said hose opposite the aforesaid nipple when the latter is inserted therein; and a set screw carried by each of said clamp plates, each of said set screws being projectable a variable distance into engagement with the inner member to prevent longitudinal displacement between said inner member and said constricting member.

2. A combination as defined in claim 1 in which there are three of said clamp plates to compensate for hose of different diameter and to insure an equal radial pressure against said hose, said clamp plates being bolted together.

In testimony whereof, I have hereunto set my hand at Los Angeles, California, this 19th day of June, 1924.

GROVER C. DEAKINS.